United States Patent
Roots (10) Patent No.: US 10,151,968 B2
(45) Date of Patent: Dec. 11, 2018

(54) MULTI-CAMERA MOUNT

(71) Applicant: Brandon T. Roots, Brooklyn, NY (US)

(72) Inventor: Brandon T. Roots, Brooklyn, NY (US)

( * ) Notice: Subject to any disclaimer, the term of this patent is extended or adjusted under 35 U.S.C. 154(b) by 0 days.

(21) Appl. No.: 15/670,960

(22) Filed: Aug. 7, 2017

(65) Prior Publication Data

US 2018/0046067 A1    Feb. 15, 2018

Related U.S. Application Data

(60) Provisional application No. 62/372,787, filed on Aug. 9, 2016.

(51) Int. Cl.
| | |
|---|---|
| *F16M 11/10* | (2006.01) |
| *G03B 17/56* | (2006.01) |
| *G03B 17/04* | (2006.01) |
| *F16M 11/12* | (2006.01) |
| *G02B 7/00* | (2006.01) |
| *G03B 17/00* | (2006.01) |

(52) U.S. Cl.
CPC .......... *G03B 17/561* (2013.01); *F16M 11/10* (2013.01); *F16M 11/12* (2013.01); *G03B 17/04* (2013.01); *G02B 7/00* (2013.01); *G03B 17/00* (2013.01)

(58) Field of Classification Search
CPC ...... G03B 17/561; G03B 17/04; G03B 17/00; G02B 7/00
See application file for complete search history.

(56) References Cited

U.S. PATENT DOCUMENTS

| | | |
|---|---|---|
| 5,721,585 A | 2/1998 | Keast et al. |
| 6,301,447 B1 | 10/2001 | Jackson et al. |
| 9,152,019 B2 | 10/2015 | Kinter |
| 9,413,930 B2 * | 8/2016 | Geerds .................. H04N 5/2252 |
| 9,575,394 B1 * | 2/2017 | Wallace ............... H04N 5/2252 |
| 9,921,464 B1 * | 3/2018 | Choi ...................... G03B 37/00 |

(Continued)

FOREIGN PATENT DOCUMENTS

| | | |
|---|---|---|
| CN | 201233503 Y | 5/2009 |
| CN | 202166824 U | 3/2012 |

OTHER PUBLICATIONS

"360Heros 3DPRO14H Stereoscopic 3D 360 Plug-n-Play Holder for GoPro." https://www.bhphotovideo.com/c/product/1191247-REG/360heros_3dpro14h_stereoscopic_3d_360_deg.html.

*Primary Examiner* — Anita M King
(74) *Attorney, Agent, or Firm* — Richard C. Litman (57) ABSTRACT

The multi-camera mount includes a base plate having a center portion and a plurality of L-shaped brackets. Each L-shaped bracket includes a horizontal portion extending radially outward from the center portion, and a vertical portion. The horizontal portion includes a proximal end connected to the center portion of the base plate and an opposing distal end. The vertical portion includes a first end connected to the distal end of the horizontal portion and an opposing second end. The multi-camera mount also includes a plurality of adjustable support members, each adjustable support member being pivotally attached to the second end of the vertical portion of the corresponding L-shaped bracket. Further, the multi-camera mount may also include an actuating mechanism including a motor having a drive shaft and a worm gear mounted on the drive shaft, the worm gear configured for allowing for finer and remote adjustments of each camera module.

15 Claims, 6 Drawing Sheets

(56) References Cited

U.S. PATENT DOCUMENTS

| | | | |
|---|---|---|---|
| 10,027,948 B2 * | 7/2018 | Cole | ............... G03B 17/561 |
| 2013/0201296 A1 | 8/2013 | Weiss et al. | |
| 2015/0341617 A1 | 11/2015 | Cole et al. | |

* cited by examiner

MULTI-CAMERA MOUNT

CROSS-REFERENCE TO RELATED APPLICATION

This application claims the benefit of U.S. patent application Ser. No. 62/372,787, filed Aug. 9, 2016.

BACKGROUND OF THE INVENTION

1. Field of the Invention

The present invention relates to three-dimensional (3D) camera systems, and particularly to an embodiment for a camera system or a multi-camera mount for maneuvering a plurality of camera modules and capturing 360° by 180° 3D images.

2. Description of the Related Art

While the demand for 360° images grows, it becomes necessary to construct user-friendly devices capable of capturing 360° content. Content is most immersive when captured in 3D, permitting the viewer to experience images they can look around and perceive with depth.

When dealing with the capture of a 360° monoscopic image, camera module alignment generally does not present any issues, so long as there is sufficient overlap at image seams. As the need for capturing 360° 3D image data, e.g., pairs of images, which can be used as left and right eye images, grows, there is a need for camera-related rigs, which can be used to facilitate the capture of pairs of left and right eye images. However, most camera mechanisms in today's market enabling the creation of 360° 3D photos and/or videos require a plurality of camera modules, commonly between six and sixteen cameras, each with limited fields of view to capture the overlapping fields of view necessary to generate a 360° 3D image set. Such devices are not only expensive, but also cumbersome to use. They also tend to generate a tremendous number of data streams that must be processed by complex and expensive software to create a usable image.

Additionally, most devices permitting the capture of 360° 3D images hold the camera modules in a rigid array. This fixed position does not permit adjustment of the interaxial distance or "depth effect" during production. In rigid arrays this separation is usually based on average human vision. However, other interaxial distances may be desirable for creative uses, such as filming subjects that are either very near or far from the camera system. Further, camera module alignment tends to be important for the useful capture of 3D image data. However, when capture of 3D images corresponding to a 360° area is desired, the complexity with camera module alignment and positioning is greatly complicated, since 3D images need to be captured in a manner that allows them to be recombined from a known alignment for viewing purposes. Additionally, for at least some applications, it is desirable that the camera module and its mount be relatively small and compact so that it can be placed where a larger fixed or tracked camera rig may not be able to fit.

Thus a multi-camera mount solving the aforementioned problems is desired.

SUMMARY OF THE INVENTION

The multi-camera mount includes a base plate having a center portion and a plurality of L-shaped brackets. Each L-shaped bracket includes a horizontal portion extending outward laterally from the center portion, and a vertical portion. The horizontal portion includes a proximal end connected to the center portion of the base plate and an opposing distal end. The vertical portion includes a first end connected to the distal end of the horizontal portion and an opposing second end. The multi-camera mount also includes a plurality of adjustable support members, each adjustable support member being pivotally attached to the second end of the vertical portion of the corresponding L-shaped bracket. Further, the multi-camera mount may also include an actuating mechanism including a motor having a drive shaft and a worm gear, the worm gear being positioned on the drive shaft, the worm gear configured for allowing for finer and remote adjustments of each camera module. Further, extensions are also possible that could act as riser blocks for the camera modules extending the interaxial distance, or permit the use of camera modules without 360° fields of view by rotating the camera module's alignment as the mount expands outward.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
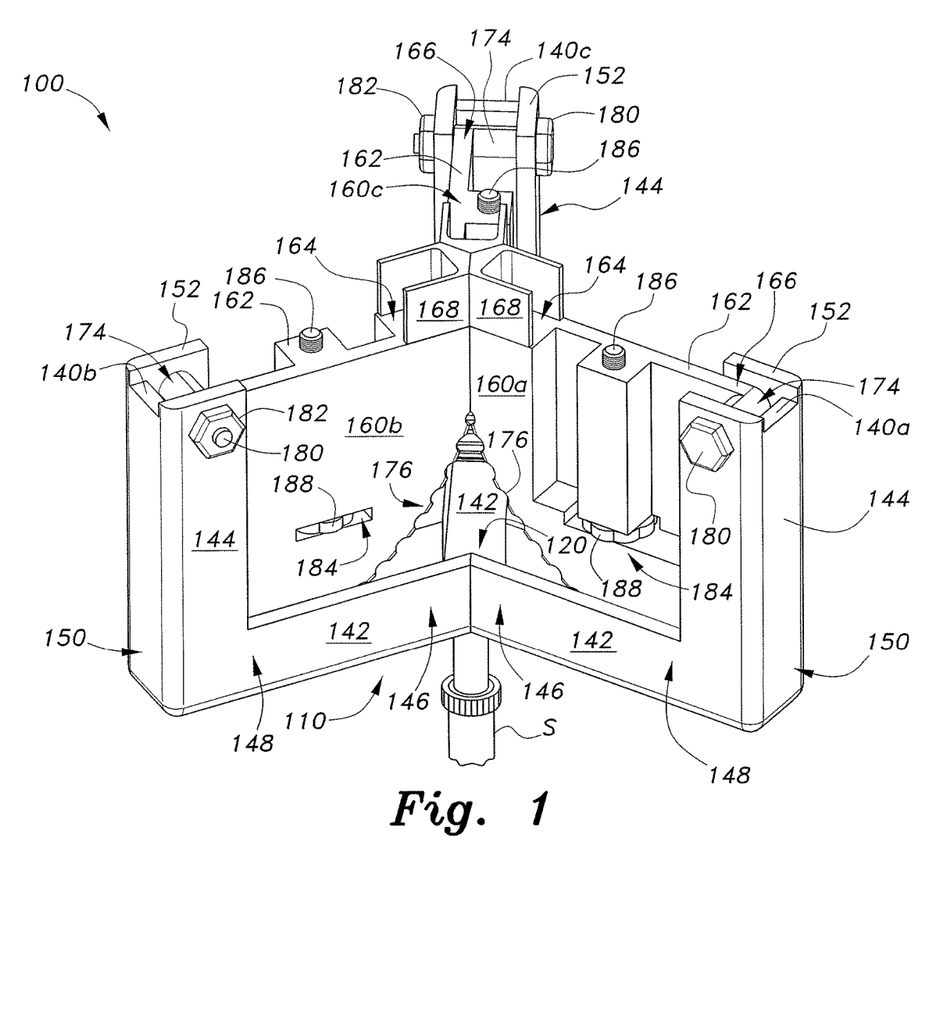
FIG. 1 is an environmental perspective view of a multi-camera mount according to the present invention.

Referring to FIGS. 1-6, the multi-camera mount 100 is configured for adjusting the interaxial distance or "depth effect" among a plurality of camera modules C during production of images. The multi-camera mount 100 includes a base plate 110 adapted for attachment to a camera stand S, to a drone (not shown), to an elevated structure (not shown), to a vehicle (not shown), to a camera slider (not shown), or to any other suitable support. The base plate 110 includes a center portion 120 having an opening 130 defined therein, as well as a plurality of L-shaped brackets, including a first L-shaped bracket 140*a*, a second L-shaped bracket 140*b*, and a third L-shaped bracket 140*c*. Each L-shaped bracket 140*a*-140*c* includes a horizontal portion 142 extending outward laterally or radially from the center portion 120, such that the horizontal portion 142 of each L-shaped bracket 140*a*-140*c* is co-planar, and a vertical portion 144. The horizontal portion 142 includes a proximal end 146 connected to the center portion 120 of the base plate 110 and an opposing distal end 148. The vertical portion 144 includes a first end 150 connected to the distal end 148 of the horizontal portion 142 and an opposing second end 152. The vertical portion 144 of each bracket 140a-140c extends upward from the distal end 148 of the corresponding horizontal portion 142 such that the vertical portions 144 are parallel to each other, as illustrated in FIGS. 1-5. FIG. 1 shows three L-shaped brackets 140a, 140b, and 140c radially spaced 120° apart.

The multi-camera mount 100 also includes a plurality of adjustable support members, including a first adjustable support member 160a, a second adjustable support member 160b, and a third adjustable support member 160c.

Each adjustable support member 160a-160c includes an upper leg 162 configured for supporting the corresponding camera module C, such as the Ricoh Theta®. Extensions (not shown) may be used as riser blocks for the camera module C, extending the achievable interaxial distance, or that permit the use of the camera modules without full 360° fields of view by rotating to maintain the camera's horizon line while the mechanism expands outward. The upper leg 162 includes an inner end 164 having a clamping mechanism 168 for securing the corresponding camera module C and an outer end 166, as well as a lower leg 170 having an upper end 172 and a lower end 175. The outer end 166 of the upper leg 162 is joined to the upper end 172 of the lower leg 170, forming a pivot point 174 having a 90° angle. The pivot point 174 of each adjustable support member 160a-160c is pivotally or rotatably attached to the second end 152 of the vertical portion 144 of each corresponding L-shaped bracket 140a-140c. For example, the pivot point 174 of the first adjustable support member 160a is pivotally attached to the second end 152 of the vertical portion 144 of the first L-shaped bracket 140a, the pivot point 174 of the second adjustable support member 160b is pivotally attached to the second end 142 of the vertical portion 144 of the second L-shaped bracket 140b, and the pivot point 174 of the third adjustable support member 160c is pivotally attached to the second end 152 of the vertical portion 144 of the third L-shaped bracket 140c.

Further, the inner end 164 of the upper leg 162 of each adjustable support member 160a-160c faces inward, i.e., towards the center portion 120 of the base plate 110, such that the upper leg 162 is parallel to the horizontal portion 142 of the corresponding L-shaped bracket 140a-140c, and the lower end 175 of the lower leg 170 faces downward, i.e., toward the horizontal portion 142 of each corresponding L-shaped bracket 140a-140c, such that the lower leg 170 is parallel to the vertical portion 144 of the corresponding L-shaped bracket 140a-140c.

Figure 6:
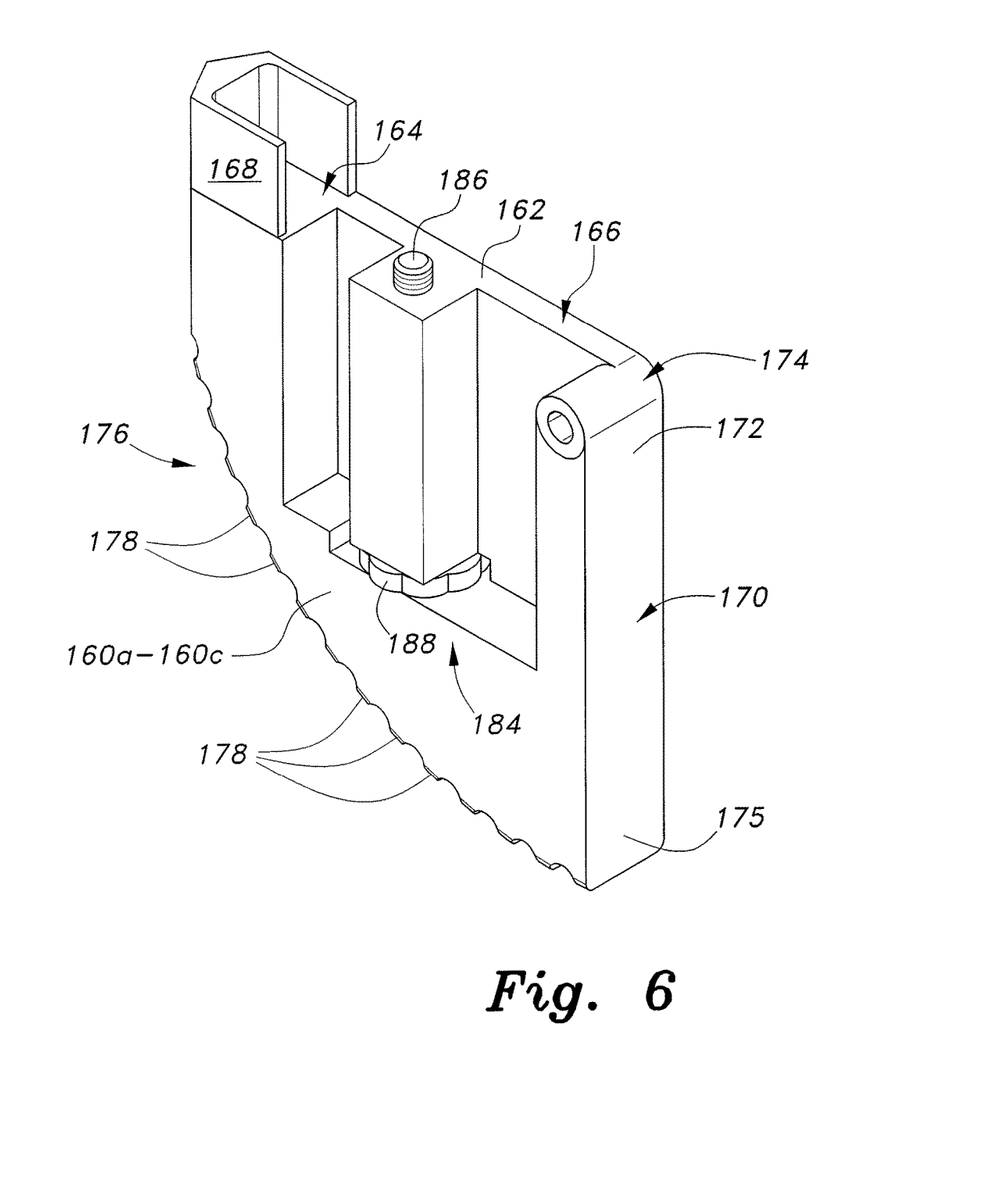
FIG. 6 is a partial perspective view showing details of a single adjustable support member of a multi-camera mount according to the present invention.

Each adjustable support member 160a-160c further includes a convex outer leg 176 connecting the inner end 164 of the upper leg 162 and the lower end 175 of the lower leg 170 of each corresponding adjustable support member 160a-160c, as illustrated in FIG. 6. The convex outer leg 176 is positioned opposite the pivot point 174 having the 90° angle. Each convex outer leg 176 includes a plurality of teeth 178 evenly spaced along the convex outer leg 176.

Figure 2:
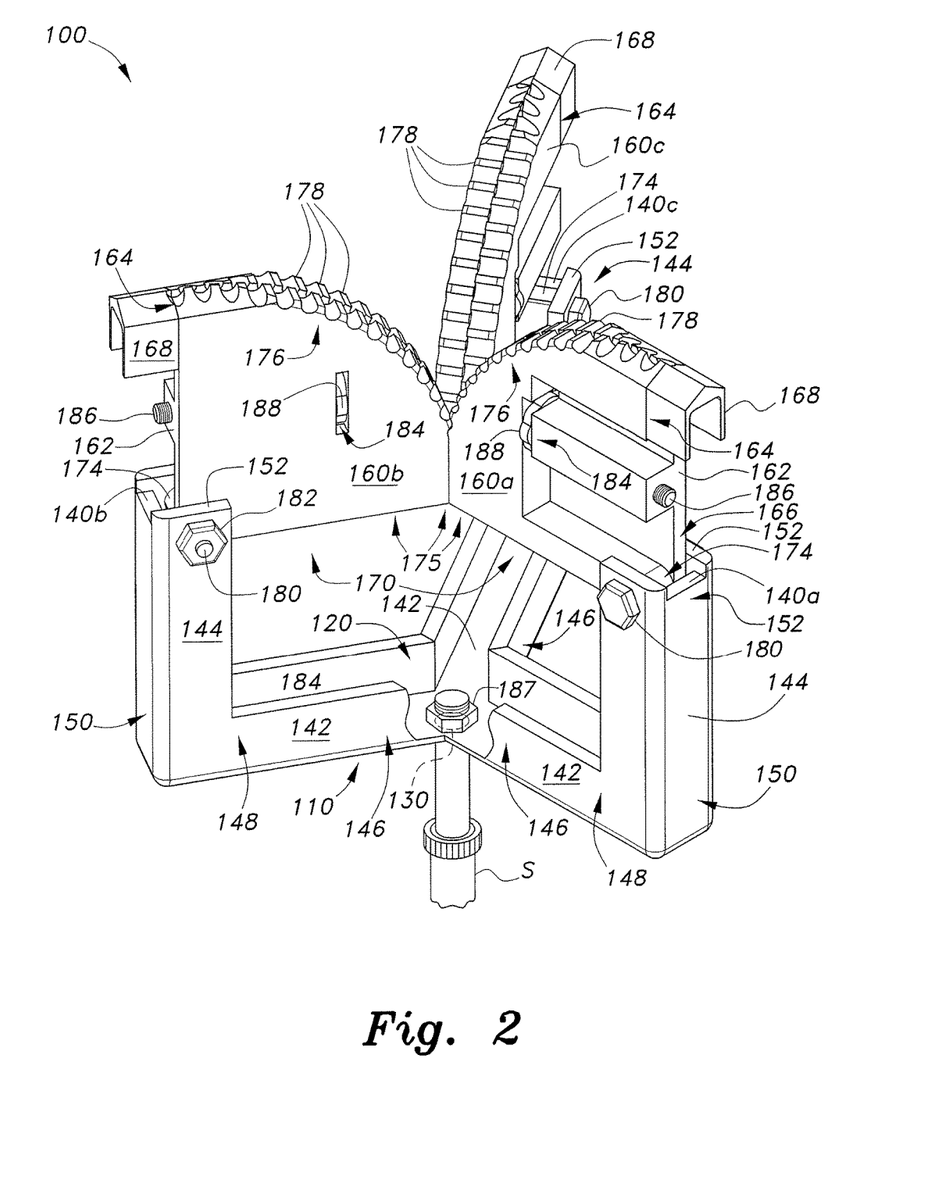
FIG. 2 is another environmental perspective view of the multi-camera mount of FIG. 1.
Figure 3:
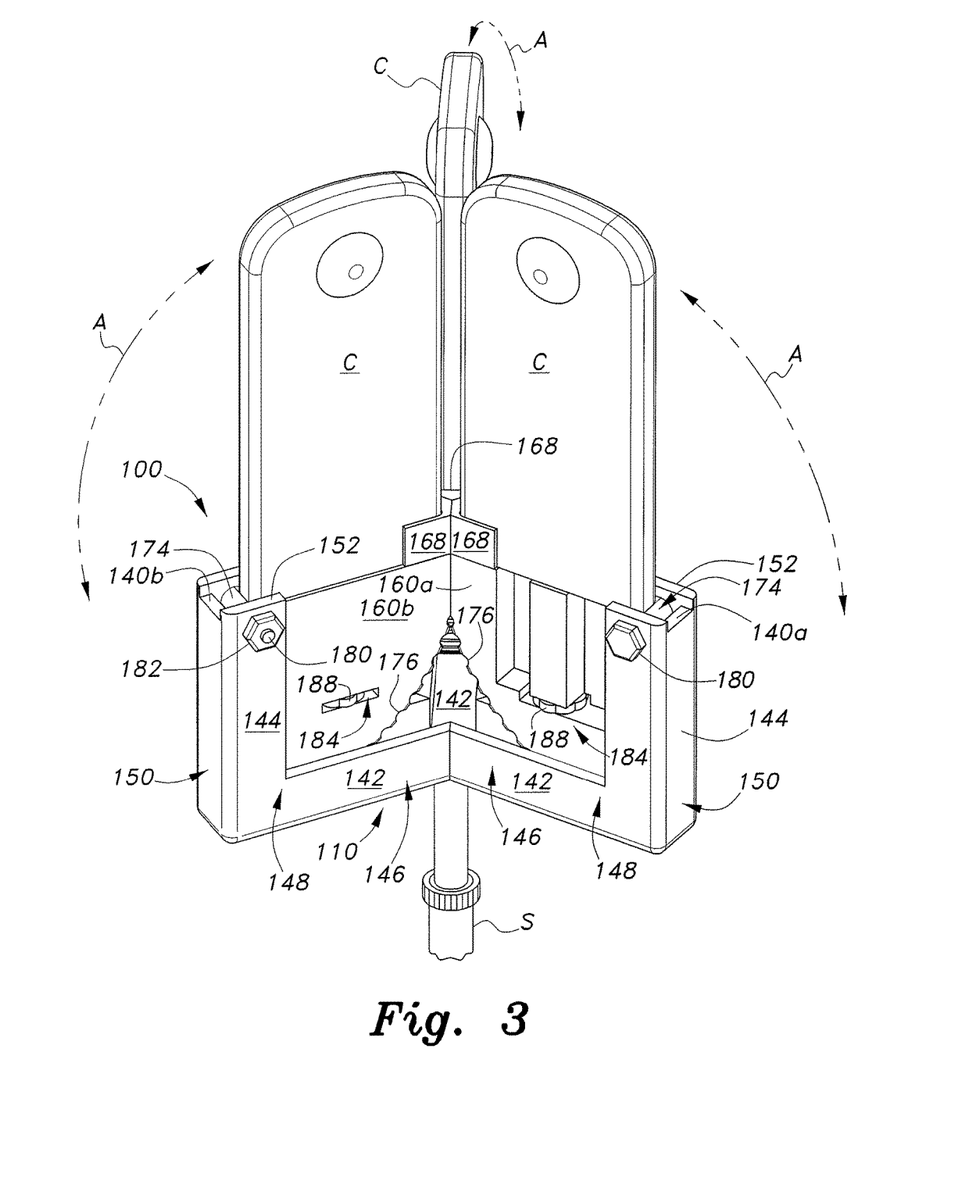
FIG. 3 is an environmental perspective view of the multi-camera mount of FIG. 1, shown with a plurality of camera modules mounted thereon, configured with the camera modules held vertically.
Figure 4:
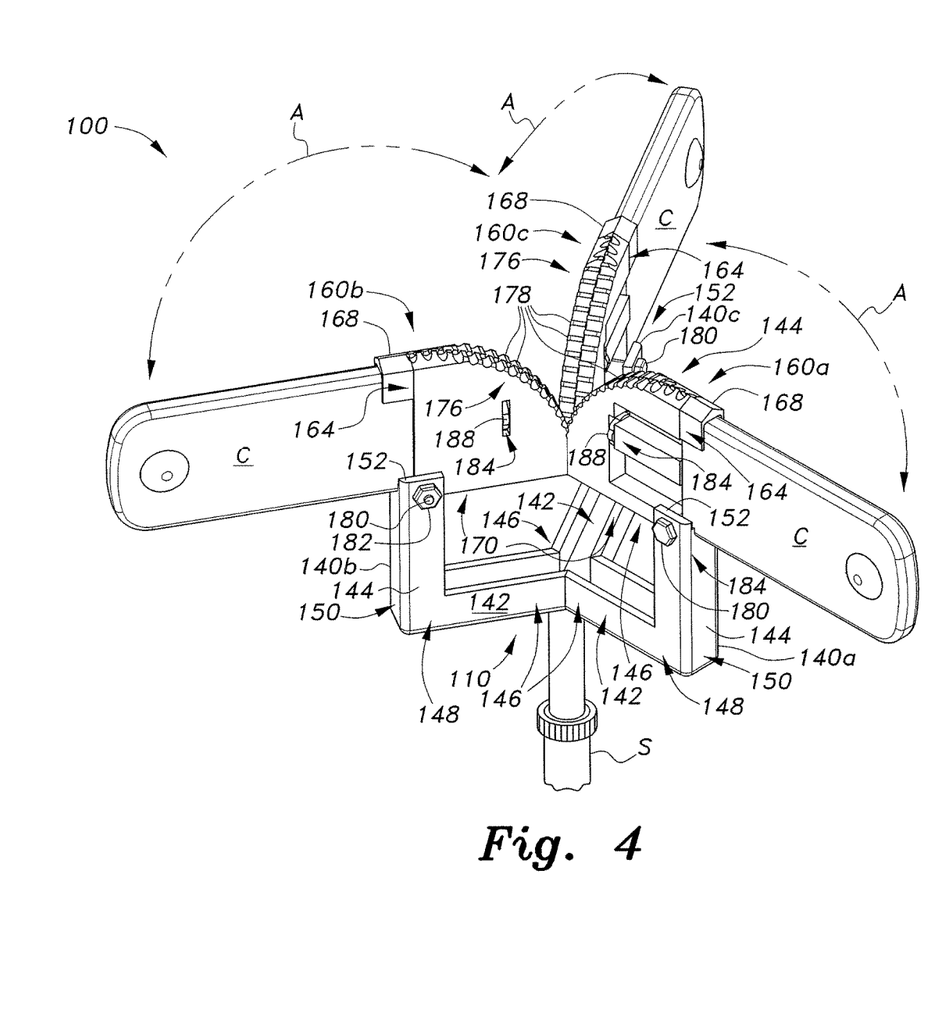
FIG. 4 is an environmental perspective view of the multi-camera mount of FIG. 1, shown with a plurality of camera modules mounted thereon, configured with the camera modules held horizontally.

The convex outer leg 176 of each adjustable support member 160a-160c faces inward, i.e., towards the center portion 120 of the base plate 110. The convex outer leg 176 of each adjustable support member 160a-160c is positioned in communicating relation with the convex outer leg 176 of the other adjustable support members 160a-160c, such that the plurality of teeth 178 of one convex outer leg 176 interconnects with the plurality of teeth 178 of the convex outer leg 176 of the other adjustable support members 160a-160c. It is to be noted that depending on the configuration of the multi-camera mount 100, the plurality of teeth 178 of each convex outer leg 176 can be offset, as illustrated in FIGS. 2 and 4, along the convex outer leg 176 so that the teeth 178 of one convex outer leg 176 do not interfere (i.e. are not in direct contact) with the teeth 178 of another convex outer leg 176.

For example, the convex outer leg 176 of the first adjustable support member 160a is positioned in communicating relation with the convex outer leg 176 of the second adjustable support member 160b, and the convex outer leg 176 of the third adjustable support member 160c is positioned in communicating relation with both the convex outer leg 176 of the first adjustable support member 160a and convex outer leg 176 the second adjustable support member 160c, such that the movement of each adjustable support member 160a-160c relative to the other adjustable support members 160a-160c can be synchronized. In other words, so that all the adjustable support members 160a-160c can move in unison in a range between 0° and 90°, such as in an upward direction or in a downward direction. When used with standalone camera modules, the synchronization of the camera modules C in the array can be confirmed visually by use of a light emitting element on a portion of the multi-camera mount 100 or by audio waveforms recorded by the camera modules C.

The pivot point 174 of each adjustable support member 160a-160c can be movably coupled to the second end 152 of the vertical portion 144 of each corresponding L-shaped bracket 140a-140c by any suitable means. For example, a fastener 180, such as a bolt, can be inserted into the second end 152 of the vertical portion 144 of each of the plurality of L-shaped brackets 140a-140c, through the pivot point 174 of the corresponding adjustable support member 160a-160c, and out through the other side of the second end 152 of the vertical portion 144 of the L-shaped bracket 140a-140c. The fastener 180 can be secured to the second end 152 of the vertical portion 144 of each L-shaped bracket 140a-140c by any suitable means 182, such as nut, so as to allow each adjustable support member 160a-160c to pivot about the fastener 180 between 0° and 90°, wherein 0° defines the minimum interaxial distance between lenses and 90° defines the maximum distance between the lenses.

Each adjustable support member 160a-160c includes a locking mechanism 184 having a threaded bolt 186, such as a UNC 1/4-20 bolt adapted for threading into a standard tripod mounting hole in the base of the camera, attached to a dial or knob 188, for attaching each camera module C onto the upper leg 162 of one of the corresponding adjustable support member 160a-160c. By way of operation, as the user rotates the dial 188 in a given direction, such as in clockwise direction, the threaded bolt 186 will rotate in the given direction to secure the camera module C onto the upper leg 162 of the corresponding adjustable support member 160a-160c. Once the user is finished shooting the images, she/he can rotate the dial 188 in a direction opposite the given direction, such as in a counter-clockwise direction, to release the camera module C from the upper leg 162 of the corresponding adjustable support member 160a-160c.

Figure 5:
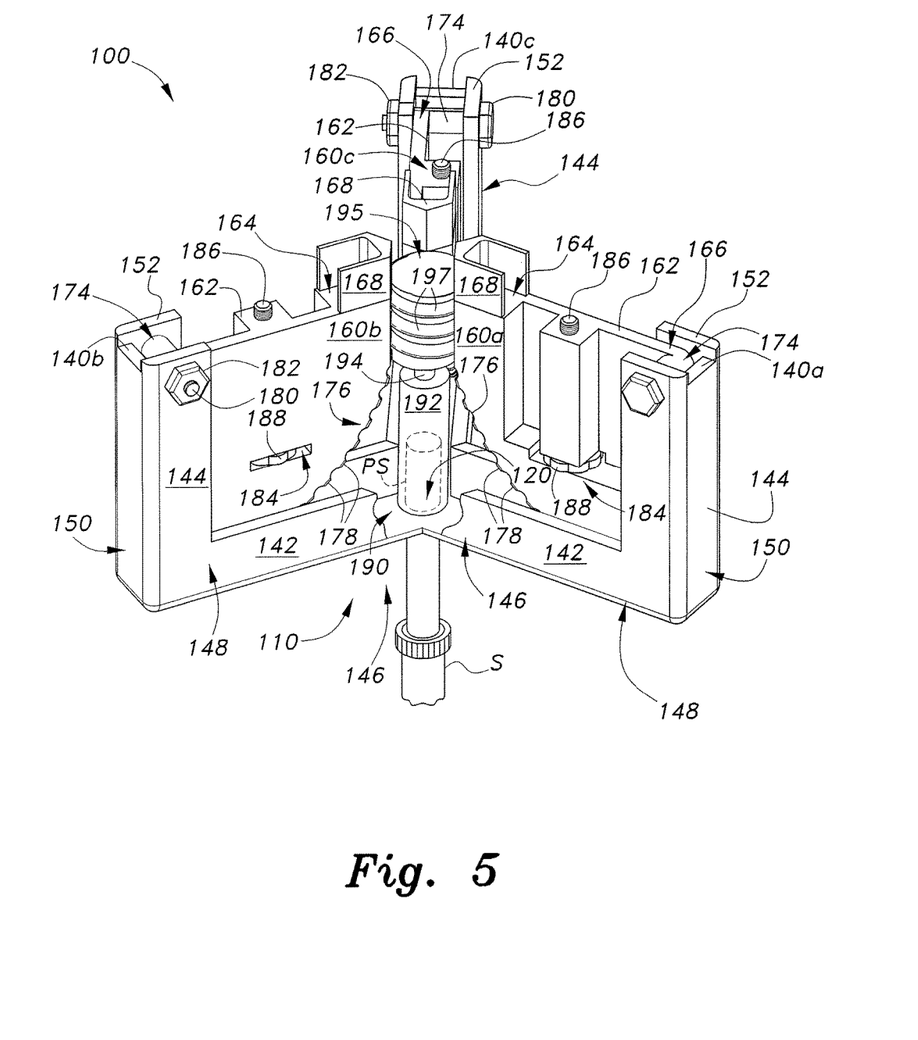
FIG. 5 is an environmental perspective view of an embodiment of a multi-camera mount according to the present invention having an actuating mechanism.

The multi-camera mount 100 may also include an actuating mechanism 190. The actuating mechanism 190 includes a motor 192, such as a servo motor, having a drive shaft 194 and a worm gear 195, the worm gear 195 being positioned on the drive shaft 194, as illustrated in FIG. 5. The worm gear 195 includes a plurality of teeth 197 and is positioned in communicating relation with the convex outer leg 176 of each adjustable support member 160a-160c. For example, each of the plurality of teeth 197 of the worm gear 195 is positioned between the teeth 178 positioned along the convex outer leg 176 of each adjustable support member 160a-160c. Depending on the speed and precision required of the adjustments for each adjustable support member 160a-160c, the worm gear 195 may allow for finer and remote adjustments of each adjustable support member 160a-160c and, in turn, each camera module C.

It is to be understood that the motor 192 in the actuating mechanism 190 can be controlled remotely, which can be useful for controlling the multi-camera mount 100 positioned in a remote location, such as on a drone or on an elevated structure, that is difficult to reach. Further, the multi-camera mount 100 can include a locking mechanism (not shown), such as a spring-loaded central element, to prevent each of the adjustable support members 160a-160c from moving unintentionally.

By way of operation, upon activating the motor 192, the drive shaft 194 and the corresponding worm gear 195 can rotate in a given direction, such as in a clockwise or in a counter-clockwise direction, so as to rotate the adjustable support members 160a-160c in an upward or in a downward direction, respectively, and, in turn, increase or decrease the distance between the lens of each camera module C. For example, when the drive shaft 194 and the corresponding worm gear 195 rotate in a given direction, such as in a clockwise direction, the teeth 197 of the worm gear 195 can engage the teeth 178 of the convex outer leg 176 of each adjustable support member 160a-160c so as to move each adjustable support member 160a-160c in an upward direction, for example. The drive shaft 194 and the corresponding worm gear 195 may also move in the opposite direction, such as in a counterclockwise direction, such that the teeth 197 of the worm gear 195 can engage the teeth 178 of the convex outer leg 176 of each adjustable support member 160a-160c so as to move each adjustable support member 160a-160c in a downward direction, for example. As discussed herein, each adjustable support member 160a-160c and corresponding camera module C can rotate about each corresponding fastener 180 in a range from about 0° to 90°, as illustrated by the arrows A in FIGS. 3 and 4. It is to be noted that the actuating mechanism 190 can be positioned in communicating relation to a power source PS, such as batteries, configured for powering the actuating mechanism 190.

The base plate 110 can be formed from any material, such as plastic, suitable for supporting the camera modules C positioned on the upper leg 162 of each adjustable support member 160a-160c of the base plate 110. Further, the stand S utilized to support the base plate 110 can be any type of stand, such as a tripod, suitable for supporting the base plate 110, as well as the plurality of camera modules C positioned on each of the adjustable support members 160a-160c. For example, the base plate 110 can be attached to the stand S by any suitable means, such as a bolt 187 protruding from the stand S, the bolt being configured for fitting into the opening 130 of the center portion 120 of the base plate 110. The bolt can then be threaded through the opening 130 of the center portion 120 of the base plate 110 as a means of supporting the base plate 110 on the stand S. Further, the stand S can be a telescoping stand so that the height of the stand can be adjusted to a desirable height suitable for capturing the desired images.

As discussed above, the movement of each camera module C, such as in an upward direction or in a downward direction can be synchronized to the other camera module C. Control of each camera module C can be done wirelessly using the Open Spherical Camera API or by other suitable methods tailored to the model of camera being used, as well as via a hard-wired connection, such as a USB connection, using standard protocols, such as picture transfer protocol (PTP). Further, it is to be noted that the dimensions of each adjustable support member 160a-160c, as well as the length of each horizontal portion 142 of each L-shaped bracket 140a-140b, can vary to accommodate other types of cameras. It is to be noted that as each of the camera modules C is recording the entire available field of view, the multi-camera mount 100 can be rotated freely, either manually or mechanically, in any direction such that the recorded image and the horizon line are correctly stabilized in post-production without any significant loss of the image area.

It is to be understood that the present invention is not limited to the embodiments described above, but encompasses any and all embodiments within the scope of the following claims.

I claim:

1. A multi-camera mount, comprising:
a base plate having a center portion;
a plurality of L-shaped brackets, each of the brackets including a horizontal portion extending radially outward from the center portion of the base plate, and a vertical portion, the horizontal portion having a proximal end connected to the center portion of the base plate and an opposing distal end, the vertical portion having a first end coupled to the distal end of the horizontal portion and an opposing second end; and
a corresponding adjustable support member mounted on each of the L-shaped brackets, the adjustable support member including:
an upper leg having an inner end and an outer end;
a lower leg having an upper end and a lower end;
a pivot point, the upper end of the lower leg being connected to the outer end of the upper leg at the pivot point, the pivot point of the adjustable support member being pivotally attached to the opposing second end of the vertical portion of the corresponding L-shaped bracket; and
a convex outer leg connecting the inner end of the upper leg and the lower end of the lower leg, the convex outer leg having a plurality of teeth spaced apart thereon.

2. The multi-camera mount according to claim 1, further comprising an actuating mechanism positioned in communicating relation with one of the adjustable support members.

3. The multi-camera mount according to claim 2, wherein the actuating mechanism comprises a motor including a drive shaft and a worm gear mounted on the drive shaft.

4. The multi-camera mount according to claim 3, wherein the worm gear includes a plurality of teeth, the teeth of the worm gear meshing with the spaced apart teeth on the convex outer leg of each said adjustable support member.

5. The multi-camera mount according to claim 1, wherein the inner end of the upper leg of each said adjustable support member comprises a clamping mechanism adapted for securing a corresponding camera module.

6. The multi-camera mount according to claim 1, wherein each said adjustable support member includes a locking mechanism adapted for attaching each camera module onto the upper leg of each said adjustable support member.

7. The multi-camera mount according to claim 6, wherein the locking mechanism comprises a threaded bolt and a knob attached to the bolt.

8. The multi-camera mount according to claim 7, wherein the threaded bolt comprises a UNC 1/4-20 bolt.

9. A multi-camera mount, comprising:
a base plate having a center portion;
a plurality of L-shaped brackets, each of the brackets including a horizontal portion extending radially outward from the center portion of the base plate, and a vertical portion, the horizontal portion having a proximal end connected to the center portion of the base plate and an opposing distal end, the vertical portion having a first end coupled to the distal end of the horizontal portion and an opposing second end; and
a corresponding adjustable support member mounted on each of the L-shaped brackets, the adjustable support member including:
an upper leg having an inner end and an outer end;
a lower leg having an upper end and a lower end;
a pivot point, the upper end of the lower leg being connected to the outer end of the upper leg at the pivot point, the pivot point of each adjustable support member being pivotally attached to the opposing second end of the vertical portion of each L-shaped bracket; and
a convex outer leg connecting the inner end of the upper leg and the lower end of the lower leg, the convex outer leg having a plurality of teeth spaced apart thereon; and
an actuating mechanism positioned in communicating relation with one of the adjustable support members.

10. The multi-camera mount according to claim 9, wherein the actuating mechanism comprises a motor including a drive shaft and a worm gear mounted on the drive shaft.

11. The multi-camera mount according to claim 10, wherein the worm gear includes a plurality of teeth, the teeth of the worm gear meshing with the spaced apart teeth on the convex outer leg of each said adjustable support member.

12. The multi-camera mount according to claim 9, wherein the inner end of the upper leg of each said adjustable support member comprises a clamping mechanism adapted for securing a corresponding camera module.

13. The multi-camera mount according to claim 9, wherein each said adjustable support member includes a locking mechanism adapted for attaching a camera module onto the upper leg of each said adjustable support member.

14. The multi-camera mount according to claim 13, wherein the locking mechanism comprises a threaded bolt having a knob attached thereto.

15. The multi-camera mount according to claim 14, wherein the threaded bolt comprises a UNC 1/4-20 bolt.

* * * * *